(12) United States Patent
Beniaminy et al.

(10) Patent No.: US 7,565,338 B2
(45) Date of Patent: Jul. 21, 2009

(54) METHOD AND SYSTEM FOR SHARING KNOWLEDGE

(75) Inventors: Israel Beniaminy, Ramat Gan (IL); Moshe Ben-Bassat, Lexington, MA (US)

(73) Assignee: Clicksoftware Technologies Ltd., Petach-Tikva (IL)

( * ) Notice: Subject to any disclaimer, the term of this patent is extended or adjusted under 35 U.S.C. 154(b) by 165 days.

(21) Appl. No.: 10/332,730

(22) PCT Filed: Jul. 12, 2001

(86) PCT No.: PCT/IL01/00643

§ 371 (c)(1),
(2), (4) Date: Aug. 29, 2003

(87) PCT Pub. No.: WO02/07087

PCT Pub. Date: Jan. 24, 2002

(65) Prior Publication Data

US 2004/0044542 A1    Mar. 4, 2004

(30) Foreign Application Priority Data

Jul. 13, 2000    (IL) .................................... 137305

(51) Int. Cl.
*G06N 5/02* (2006.01)
*G06N 7/00* (2006.01)
*G06N 7/08* (2006.01)
(52) U.S. Cl. .......................................... 706/47; 706/55
(58) Field of Classification Search .................... 706/1, 706/15, 45, 25, 60; 707/3, 9; 709/206; 705/10, 705/1; 364/474.22, 550, 552, 513, 551.01; 380/25; 345/327; 700/1, 90; 600/300, 301
See application file for complete search history.

(56) References Cited

U.S. PATENT DOCUMENTS 4,697,243 A * 9/1987 Moore et al. .................. 706/59

(Continued)

FOREIGN PATENT DOCUMENTS

WO    WO-98/20435 A1    5/1998

(Continued)

OTHER PUBLICATIONS

Can Model-Based and Case-Based Expert Systems Operate Together?: Dr. Moshe Ben-Bassat, Israel Beniaminy, David Joseph, 1998, IEEE, 0-7803-5092-8/98, p. 793-800.*

(Continued)

*Primary Examiner*—David R Vincent
*Assistant Examiner*—Peter Coughlan
(74) *Attorney, Agent, or Firm*—Fogg & Powers LLC

(57) ABSTRACT

A method for providing technical support via a network is disclosed. The method involves providing a database which contains searchable technical support information, the searchable technical support information remotely accessible and divided into a plurality of support sessions. When the database is accessed for technical support, the method performs an electronic serial dialogue between the database and a user. If no solution to the failure is obtained at the end of the electronic serial dialogue, the method immediately transfers a display of the electronic serial dialogue so far conducted to a selected expert. The method continues the electronic serial dialogue between the user and the selected expert while using the same textual format. When a solution to the failure is obtained based on the continued electronic serial dialogue, the method adds the continued electronic serial dialogue to the database, thereby expanding the scope of support of the database.

10 Claims, 12 Drawing Sheets

U.S. PATENT DOCUMENTS

| | | | |
|---|---|---|---|
| 5,132,920 A * | 7/1992 | Bellows et al. | 702/184 |
| 5,146,404 A * | 9/1992 | Calloway et al. | 705/1 |
| 5,239,487 A * | 8/1993 | Horejsi et al. | 702/184 |
| 5,404,503 A * | 4/1995 | Hill et al. | 714/31 |
| 5,661,668 A * | 8/1997 | Yemini et al. | 702/186 |
| 5,862,223 A * | 1/1999 | Walker et al. | 705/50 |
| 5,877,961 A * | 3/1999 | Moore | 700/180 |
| 5,909,679 A | 6/1999 | Hall | |
| 5,935,060 A * | 8/1999 | Iliff | 600/300 |
| 5,944,839 A * | 8/1999 | Isenberg | 714/26 |
| 5,983,210 A * | 11/1999 | Imasaki et al. | 706/15 |
| 5,987,444 A * | 11/1999 | Lo | 706/25 |
| 5,999,965 A * | 12/1999 | Kelly | 709/202 |
| 6,005,565 A * | 12/1999 | Legall et al. | 715/721 |
| 6,058,387 A | 5/2000 | Campbell et al. | |
| 6,064,978 A * | 5/2000 | Gardner et al. | 705/10 |
| 6,098,061 A | 8/2000 | Gotoh et al. | |
| 6,115,709 A * | 9/2000 | Gilmour et al. | 707/9 |
| 6,434,549 B1 * | 8/2002 | Linetsky et al. | 707/3 |
| 6,714,967 B1 * | 3/2004 | Horvitz | 709/206 |

FOREIGN PATENT DOCUMENTS

| | | |
|---|---|---|
| WO | WO-99/66420 A1 | 12/1999 |

OTHER PUBLICATIONS

Different Approaches to Diagnostic Modeling:Dr. Moshe Ben-Bassat, Israel Beniaminy, David Joseph, 1998, IEEE, 0-7803-4420-0/98, p. 175-186.*

'Review of Expert Systems Technology': Turban, 1988, IEEE, 0018-9391/88, IEEE Transactions of Engineering Management, vol. 35, No. 2, pp. 71-81.*

'Automating the FMEA proces': Hunt, 1993, Intelligent Systems Engineering, pp. 119-132.*

Ben-Bassat et al., Can Model-Based and Case-Based Expert Systems Operate Together?, IET—Intelligent Electronics, Mar. 1998, pp. 1-24, No. TCM1156, Published in: Anaheim, CA.

Ben-Bassat et al., Different Approaches to Fault Isolation Support Software, 1998 IEEE International Workshop on System Test and Diagnosis. 1998. pp. 1-14, Published in: Anaheim, CA.

* cited by examiner

```
Select from tree:                    Or: choose from top-10 matches:

┌─ Mechanical                     Cassette stuck
   │    ┌─ Cassette stuck
   │    └─ Noisy rewind              Wavy image
   ├─ Electronic
   │    ┌─ Front-panel display errors  ...
   │    └─ Timer failure
   └─ Image
        ┌─ Bad sync                  Or: Describe the problem:
        └─ Wavy image
```

Fig. 7

```
Select from tree:                    Or: choose from top-10 matches:

┌─ Mechanical                     Cassette stuck
   │    ┌─ Cassette stuck
   │    └─ Noisy rewind              VCR rejects cassette
   ├─ Electronic
   │    ┌─ Front-panel display errors  Noise while loading
   │    └─ Timer failure
   └─ Image
        ┌─ Bad sync                  Or: Describe the problem:
        └─ Wavy image
                                     Cannot load cassette
```

Fig. 8

```
Goal: resolve symptom "VCR rejects cassette"

Suggestions:
CF
? Is the VCR in timer mode?   OYes  O No

CF
? Is cassette write-protected?   OYes  O No

CF
! Clean and oil axle A13    OSolved  O Didn't help
```

Fig. 9

```
Goal: resolve symptom "VCR rejects cassette"

Suggestions:
CF
? Is the VCR in timer mode?   OYes  ⊙ No

CF
? Is cassette write-protected?   OYes  ⊙ No

CF
! Clean and oil axle A13    OSolved  ⊙ Didn't help
```

Fig. 10

Goal: resolve symptom "VCR rejects cassette"

Suggestions:
Please wait...

Already done:
CF
? Is the VCR in timer mode?   ○Yes  ⊙ No

CF
? Is cassette write-protected?   ○Yes  ⊙ No

CF
! Clean and oil axle A13   ○Solved  ⊙ Didn't help

Fig. 11

```
Equipment: VCR brand <x> model <y>
Reported by: Joe Brown at time <hh:mm>

Goal: resolve symptom "VCR rejects cassette"

Suggestions:
Please wait...

Already done:
CF
? Is the VCR in timer mode?   OYes  ⊙ No

CF
? Is cassette write-protected?   OYes  ⊙ No

CF
I Clean and oil axle A13   OSolved  ⊙ Didn't help

Current problems handled by Mary White:
VCR <x> <y>: VCR rejects cassette
Joe Brown
<hh:mm>
Awaiting expert DVD <c>: Bad tracking
Karen Gray
<hh:mm>
Awaiting asker Problems awaiting Mary's queue:
<model1>, <symptom1>
<technician1>
<hh:mm>
High priority <model2>, <symptom2>
<technician2>
<hh:mm>
Medium priority
```

Fig. 12

| Select from tree:                                          | Or: choose from top-10 matches: |
|                                                            |                                 |
| ├─ Mechanical                                              | Adjust pulley P54 tension       |
|     ├─ Replace wheel W56                                   | Adjust potentiometer P6         |
|     └─ Adjust pulley P54 tension                           | ...                             |
| ├─ Electronic                                              |                                 |
|     ├─ Replace motherboard                                 |---------------------------------|
|     └─ Adjust potentiometer P6                             | Or: Describe the problem:       |
| └─ ...                                                     |                                 |
|     ├─ ....                                                |                                 |
|     └─ ...                                                 |                                 |

Fig. 13

Suggestions:
Mary
? What is the voltage at TP5    ○ Less than 1V    ○ 1-5V    ○ Over 5V Mary
! Adjust potentiometer P6    ○ Solved    ○ Didn't help Mary
! Replace Wheel W56    ○ Solved    ○ Didn't help Already done:
CF
? Is the VCR in timer mode?    ○ Yes    ⊙ No CF
? Is cassette write-protected?    ○ Yes    ⊙ No CF
! Clean and oil axle A13    ○ Solved    ⊙ Didn't help

Fig. 14

METHOD AND SYSTEM FOR SHARING KNOWLEDGE

FIELD OF THE INVENTION

The present invention relates to the field of knowledge bases. More particularly, the invention relates to a method and system for capturing and sharing knowledge between the qualified personnel of a company and users or between users and qualified personnel associated with different companies.

BACKGROUND OF THE INVENTION

Troubleshooting and problem resolution pose a similar challenge: compressing large amounts of documentation, experience and information into an organized, coherent repository of knowledge and expertise. The same challenge exists in other types of knowledge-intensive processes, such as design, advice, consulting, guidance, and decision-making. In the following, the term 'problem resolution' is mean to include all such processes.

In troubleshooting and problem resolution, if expertise is not shared, the same problem that an expert solves immediately might ultimately have to be solved by a less-experienced person, after much wasted effort, time and resources.

Since experts are difficult to find, the goal has always been to let the expert's capabilities be shared by the less experienced engineers through methods such as formal and on-the-job training, mentor sponsorships, etc., and involving the expert in the production of the troubleshooting manuals. All of these methods place a demand on the expert's time. Furthermore, not always the most outstanding engineer is also the best instructor of new service persons or any other qualified personnel.

A more direct approach involves equipping each qualified engineer with "packaged knowledge" in the form of problem resolution software. By replicating the knowledge, it is possible to supply each engineer with the organization's combined troubleshooting expertise.

With this approach, the question becomes how to find the knowledge, and how to introduce it into the problem resolution software. After all, the essential problem is that a few available experts are overloaded by the need to support the whole organization. It would be impractical to attempt to solve the dilemma by asking the experts to spend months computerizing their knowledge, also because problems are solved as they present themselves, and may be difficult to remember and characterize at a distance in time.

Two prevalent methods of eliciting and organizing diagnostics expertise are the model-based method—which asks the expert to specify the components, functions, possible symptoms and available repair for the unit being serviced, and the case-based method, which relies on collecting cases (wherein each case includes the original symptom, the fact-finding or repair actions undertaken by the service engineer, and the problem resolution). By looking closely into the requirements of problem resolution software, we find that both methods play important roles. We also find that both methods share the problem discussed here: getting knowledge into the expert system.

Just as no human becomes an expert effortlessly, neither can a software expert system acquire all knowledge immediately. Information has to be input before we can get anything out. Therefore, a knowledge-based system might be a suitable solution.

THE PRIOR ART

Available commercial problem-solving software for the above-mentioned purposes include:
  The EXP Company offers a knowledge-based service to the public on www.exp.com Web site, on a number of subjects. The experts usually are paid by the users, and are also rated according to two categories: the number of questions they have been asked, and the users' recommendations.
  The ClickSoftware company offers ClickFix, a Web-based solution that supports the complete call life cycle. It enable the customers of a firm to perform simple troubleshooting procedures themselves, 24 hours a day. The expert technical team provides service for "real" service calls, and then providing them with easy access to the database and case history file. It guides engineers and technicians through each and every repair and installation with ease and by providing intuitive diagrams and instructions.
  http://www.clicksoftware.com/
  http://www.serviceware.com/
  http://www.acknosoft.com/
  http://www.primus.com/
  http://www.keen.com/
  and many other.
  Combining Model-based and Case-based Knowledge
  FIG. 5 schematically illustrates the overall approach, according to the prior art. It combines the pre-packaged Universal Domain Knowledge (511) with Initial Service Knowledge (512) for the specific equipment type and with accumulated case data (513). The emphasis on "Initial Service Knowledge" is central to this approach: It specifies tapping whatever knowledge is easily available for automatic import, and gaining additional knowledge (by implementing algorithms 517: Analytic 515 and Analogical 516) from analyzing (514) case data, using the initial knowledge to structure and refine the cases (avoiding the laborious filtering and restructuring required when relying only on case-based reasoning).

REFERENCES

Ben-Bassat M., Beniaminy I., Joseph D., Different Approaches to Fault Isolation Support Software, Proceedings of the 1998 IEEE International Workshop on System Test and Diagnosis.
Ben-Bassat M., Beniaminy I., Can Model-Based and Case-Based Expert Systems Operate Together? in "System Test and Diagnosis: Recent Trends and Case Studies", edited by John W. Sheppard and William R. Simpson.
The Problem Resolution Model: Central Knowledge Repository
  FIG. 6 schematically illustrates a possible method of defining the different parts of the problem resolution model and their interaction, according to the prior art.
  The Element Hierarchy 600 contains:
  Subsystem A (601), which comprises Board A1 (602) and Board A2 (603);
  Subsystem B (604), which comprises Board B1 (605) and Board B2 (606);
  The Symptom/Test Hierarchy 650 contains:
  Symptom1 (651) and Symptom2 (652);
  Test Acc1 (656) and Test Acc2 (657);

Test Diag1 (658);

Test Diag2 (659);

Symptom Section (653);

Acceptance Section (654);

Diagnostic Section (655);

One part of this model may be read as follows: "Board A2 (of subsystem A, 603) may fail in three different malfunction modes (MF). If mode MF1 occurs, there is a high (H) probability that symptom 1 (651) will be present, a very high (VH) probability that test Acc1 (656) will fail, and a medium (M) probability that test Diag1 (658) will fail". Such information is readily available from several sources—input from system and service engineers, as well as automatic analysis of failure patterns in recorded cases. Once in the problem resolution knowledge base, all sources contribute to the model stored in the central knowledge repository.

By using the terms 'technical personnel', 'qualified personnel' or 'qualified crew', it is meant to include any personnel whose roles require acquiring, preserving and delivering knowledge relevant to the organization's tasks. By using the term 'technical documents', it is meant to include any document containing such knowledge.

All the methods described above have not yet provided satisfactory solutions to the problem of capturing and sharing knowledge of technical issues among the technical personnel of an organization, and between it and the public.

It is an object of the present invention to provide a method and system for sharing knowledge among the personnel of a company.

It is another object of the present invention to provide a method and system for sharing knowledge between the personnel of a company and the users.

It is a further object of the present invention to provide a method and system for contribution of knowledge by the technical personnel of a company.

It is a still further object of the present invention to provide a method and system for contribution of knowledge by the customers of a company.

It is a still further object of the invention to provide a method and system for sharing knowledge inside a qualified crew regardless of where they work (large corporation, small business, independent).

It is a still further object of the invention to provide a method and system for sharing knowledge between qualified crew and users.

It is a still further object of the invention to provide a method and system for sharing knowledge among users of equipment.

It is a still further object of the invention to provide an incentive for qualified personnel to share their knowledge with the company and its personnel and customers, and to enrich the knowledge base.

It is a still further object of the invention to provide a handling case(s) in which technical personnel from one company can share their knowledge with skilled technicians from another company.

It is a still further object of the invention to provide a handling case(s) wherein technical personnel from one company can share their knowledge with users associated with another company.

Other objects and advantages of the invention will become apparent as the description proceeds.

SUMMARY OF THE INVENTION

In one aspect, the invention is directed to a method for sharing knowledge among a plurality of individuals, comprising:

a) providing a dynamically updated knowledge base that can be accessed over a network;

b) allowing an individual encountering a problem the solution of which is not known, to query the knowledge base to determine whether the problem and its solution are found in it;

c) if the solution to the problem is not available in the knowledge base, allowing the individual to prepare a query including the details of the problem;

d) broadcasting the query described in step (c) over the network;

e) allowing the experts who "listen in" the network to answer the query by filling-in their reply to the query form, and if desired, also by additional person-to-person communication;

f) conveying the answer to the query via the network to the individual who queried the system;

g) optionally, once the problem has been solved, or when the suggestions have produced no positive result, reporting by the individual the outcome of the query to the system, thereby to complete the dialogue between the individual and the system;

h) adding to the knowledge base, and making part of it, the dialogue, the problem, and information on the suggestion that led to the solution of the problem;

i) reusing the knowledge contributed in steps (a) to (g) when similar problems subsequently arise, so that they are completely solved at step (b); and j) keeping track of the knowledge contributed by each expert, and subsequent cases solved by such knowledge, as a tool for performance monitoring and incentive generation.

Optionally, the individual querying the system is a service person.

Optionally, the individual querying the system is a user.

Optionally, broadcasting is effected through a communication channel selected from a computer network, a telephone network, e-mail, and satellite.

Optionally, the query is broadcast solely, or preferentially to those experts that, according to the knowledge base, are knowledgeable in the relevant field.

Optionally, the query is broadcast to human experts, as described in claim 1 step (c), at the same time that the individual is interacting with the knowledge base as described in claim 1 step (b).

Optionally, different priorities are assigned to the queries.

Optionally, the priority is a function of the problem severity and/or the service guaranteed to the individual and/or the type of equipment regarding the query.

Optionally, the process of adding the problem information, dialogue and solution to the knowledge base, as described in claim 1, step (h), goes through a quality control process wherein each such new information is tagged for review by appropriately-authorized experts.

Optionally, the experts are notified of new and as-yet-unreviewed additions to the knowledge base, and are asked to approve, reject or edit and then approve each new addition of the information.

Optionally, if more than one expert answers the query, the system relays one or more of the answers, according to a predetermined criterion.

Optionally, the criterion is the seniority of the expert.

Optionally, the criterion is a "first to answer" criterion.

Optionally, the criterion is the level of expertise of the answering expert in the specific problem context, as defined by management and/or as updated by reviewing the performance of the expert in an earlier, similar context, and/or other strategies defined by management.

Optionally, if more than one expert and/or knowledge base mechanism answers the query, then all the answers are ranked according to the source reliability and to the ranking reported by the source itself, and relays the top-ranked answers.

The invention is also directed to a method for sharing knowledge via a knowledge base, among expert(s), company personnel and user(s), wherein the expert(s), the personnel and the user(s) are equipped with a computer/terminal connected to a network, the knowledge base being accessible via the network, comprising:

a) launching a query from the user(s) or member(s) or the personnel to the knowledge base;

b) receiving answer(s) from the knowledge base as a result of the query;

c) directing the query to the expert(s), in case of unsatisfactory answer(s); and d) registering the answer(s) in the knowledge base.

Optionally, the personnel is in charge of the maintenance/service/technical issues/help desk of the company.

Optionally, the expert(s) are members of the personnel.

Optionally, the information stored in the knowledge base is controlled, maintained, edited and removed from the knowledge base by the experts(s) and/or by the personnel and/or by the user(s).

Optionally, the query is composed of keyword(s) and optionally Boolean relations between the keywords.

Optionally, the query is free-text sentence(s).

Optionally, the knowledge base is model-based oriented (MBR).

Optionally, the knowledge base is case-based oriented (CBR).

The method may further comprise creating incentive and rewarding experts for contributing knowledge into the knowledge base.

Optionally, the contribution is based on an off-line basis and/or based on a rating policy of the the experts' contributions.

Optionally, the rating policy is based on users' assessments of knowledge provided by the expert, and/or the number of problems solved by the expert, and/or the responsiveness of the expert, and/or number of items the expert contributed to the knowledge base, and/or number of times that knowledge contributed by the expert into the knowledge base was used in success problem resolution, and/or time spent on-line handling user problems.

Optionally, the rating is used for financial bonus and/or for publishing periodic rating and "top contributors", and/or for accomplishing points and "virtual money" for use in frequent-flier programs and other purchasing plans, and/or for being used as a factor in periodic employee reviews.

Optionally, the suggestions include list(s) of required resources.

Optionally, the list(s) contains tools and/or parts and/or service(s).

Optionally, the list(s) is linked to an e-commerce system and/or an inventory system and/or job management system.

Optionally, the individual may order item(s) from the list(s).

Optionally, the knowledge is presented by multimedia means.

Optionally, the interaction with the individual is carried out by multimedia means.

Optionally, the individual may start a collaborative Web-session.

Optionally, the Web-session involves shared browsing and/or shared application(s) and/or shared whiteboard and/or conversations via voice-over-IP and/or voice conversation(s).

Optionally, the database information is edited by direct authoring or import of CBR and MBR content, and/or by direct authoring or import of troubleshooting guides, and/or by importing of raw data, and/or by direct dialog where either expert or software system highlight a specific step in the problem resolution process and inspect the reasons for the step, resulting in future knowledge base refinement.

Optionally, the raw data comprises cases and/or list(s) of symptoms and/or list(s) of replaceable part(s) and/or list(s) of relevant observation(s) and measurement(s) and/or list(s) of repair action(s) and/or engineering data and/or directed dialog wherein either expert or software system highlight a specific step in the problem resolution process and inspect the reasons for the step, resulting in future knowledge base refinement.

Optionally, the engineering data comprise block diagram(s) and/or simulation data and/or reliability estimates.

Optionally, the expert(s) are notified of new query(s)

Optionally, the notification is initiated due to a comparison between the query(s) to stored notification profile(s).

Optionally, the notification consists record(s), each of which specifying notification circumstances specified by field(s) of knowledge and/or geographical region and/or asker's profile and/or the time passed since the query was first reported and/or expert's reliability and expertise ranking.

Optionally, the record(s) describes the notification method to be used if the condition(s) specified by the record are met.

Optionally, the method is carried out by a telephone means and/or by e-mail and/or by instant messaging and/or by fax and/or by pager.

Optionally, the notification profile(s) are set and edited by the expert(s) and/or by software means.

Optionally, the knowledge base is integrated with any combination of other types of knowledge bases and knowledge retrieval.

Optionally, the types of knowledge base is fault trees and/or list(s) of common problem(s) and/or solution(s) to the problem(s) and/or troubleshooting procedure(s) and/or categorized or non-categorized searchable technical documents regarding problems.

The knowledge base may comprise information related to commerce, and/or technical support, and/or entertainment, and/or travel-related subjects, and/or software support, and/or finance consultation, and/or insurance consultation, and/or medical assistance, and/or telecommunication services.

In another aspect, the invention is directed to a system for sharing knowledge among expert(s), and/or personnel of a company and/or user(s), wherein the expert(s), the personnel and the user(s) are equipped with a communication terminal connected to a network, comprising:

a knowledge base system for storing and retrieving knowledge;

a software component for interacting with the user(s);

a software component for presenting query results; and a software component for controlling, maintaining, editing and removing information from the knowledge base system.

The system may further comprise a software component for setting up and editing notification profile(s).

Optionally, the network is a Wide Area Network (WAN).

Optionally, the network is a Local Area Network (LAN).

Optionally, the network is the organization's Internet.

Optionally, the network is the organization's Intranet.

Optionally, wherein the network is a mobile and/or wireless network.

Optionally, the network is a one-directional or two-directional paging.

Optionally, the network is a circuit-switched or packet-switched.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein:

FIG. 7 to 14 illustrates a scenario regarding the implementation of the invention over the Internet, according to a preferred embodiment of the invention.

DETAILED DESCRIPTION OF PREFERRED EMBODIMENTS

The term "Knowledge Base System" (KBS) usually applies to a database, which contains textual information, generally with a common denominator. The information entities are categorized by keywords. The platform of the stored information may be text-content documents, structured files, multimedia files, etc.

In order to retrieve such information, knowledge bases usually contain a subsystem that enables finding and retrieving information by the keywords that categorize the stored information.

Figure 1:
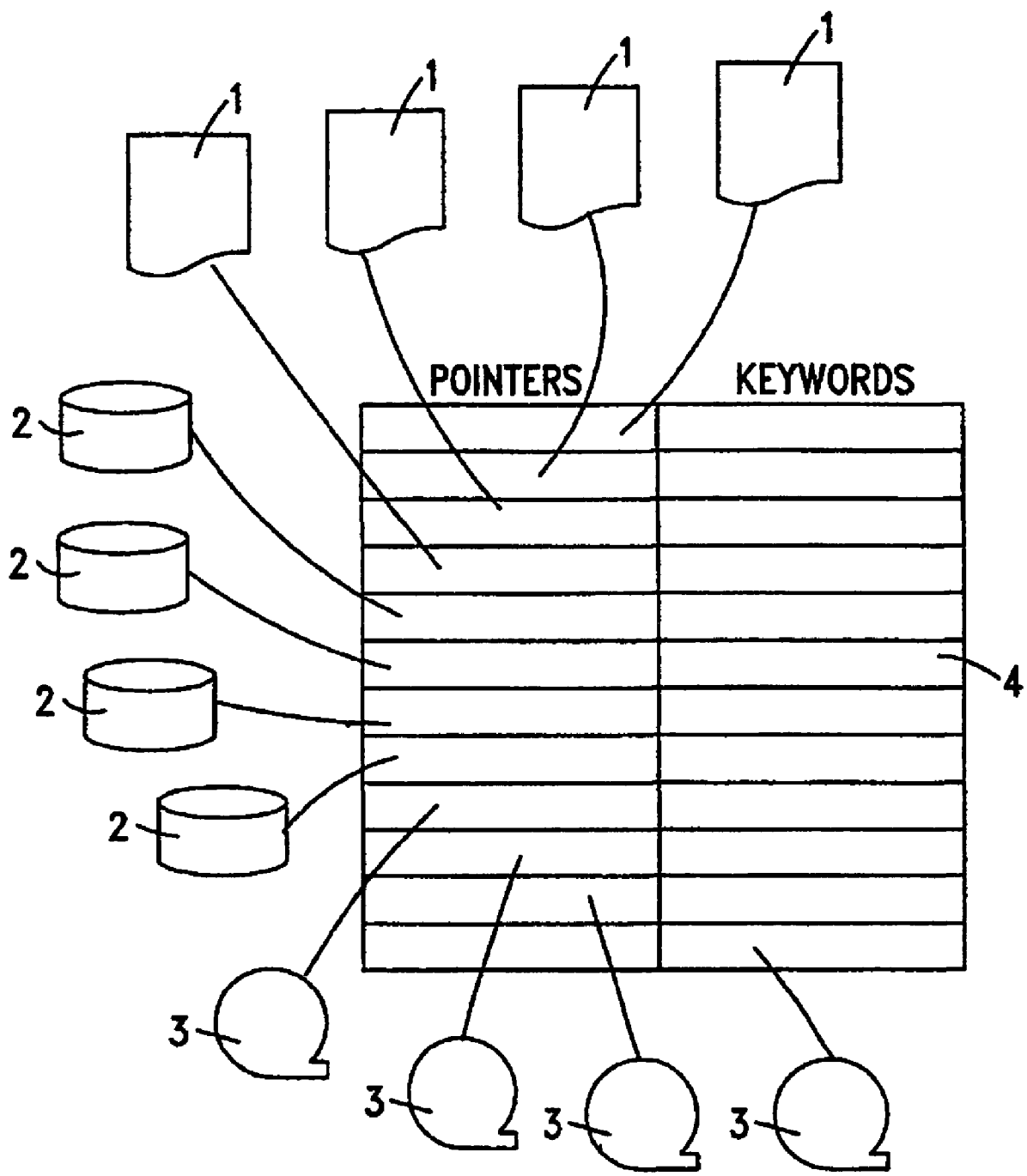
FIG. 1 schematically illustrates a knowledge base system, according to the prior art.

FIG. 1 schematically illustrates a knowledge base system, according to the prior art. It contains text-content files 1, structured files 2, multimedia files 3, and a table 4, which connects the mentioned components.

Text-content files are usually documents that have been produced by a word processor, HTML files, etc.

Structured files are usually composed of records with the same structure. Due to their nature, they usually contain information such as part-lists, error-lists, etc.

Multimedia files usually contain visual and/or audio information, such as drawings, illustrations, etc.

The keywords of a text-content file can be obtained by an automatic scan of the file, and the same is true of structured files. However, in multimedia files, the keywords are often provided manually.

In order to link the stored information and keywords describing it, knowledge bases use a table 4. Such a table contains file descriptors (name and location of a file) and a list of keywords which characterizes the files. For instance, if a file contains a description of how to handle a certain defect in an electronic system, the related keywords should describe the defect, and preferably contain the keyword "repair", as well.

In order to locate the files containing a list of keywords, a software component should scan the table 4. In matter of fact, the structure of the system is usually more complicated than described above, due to the fact that search speed is crucial for such a system, as is known to any database expert. The above-simplified description was therefore made only for the sake of brevity.

By employing a Knowledge Base System (KBS) in the company's service layout or help desk, some benefits may be achieved The service/help desk personnel can add relevant information to the knowledge base. Such information may describe flaws and their correction, instructions, etc. In this way, information regarding product maintenance is shared among the service/help desk personnel.

Additional benefits can be gained by making the knowledge base accessible to the users. From a potential buyer's point of view, one of the issues effecting the purchase decision is the service accessibility. If a product is not supported by a repair service, the potential buyer may prefer a competitor's product. However, there are users that prefer to perform maintenance by themselves, usually in order to reduce costs. Such users may prefer the product of a company supporting such repairs, and a knowledge base open to the public, at least to some extent, may be helpful in convincing potential customers of the advantages of a product.

The KBS should of course be accessible by the personnel of the company and, as explained above, in some cases by the users. The users may try to find a solution to problems that arise with the products, at least up to a certain minimal level, before appealing to the company's qualified personnel.

Figure 2:
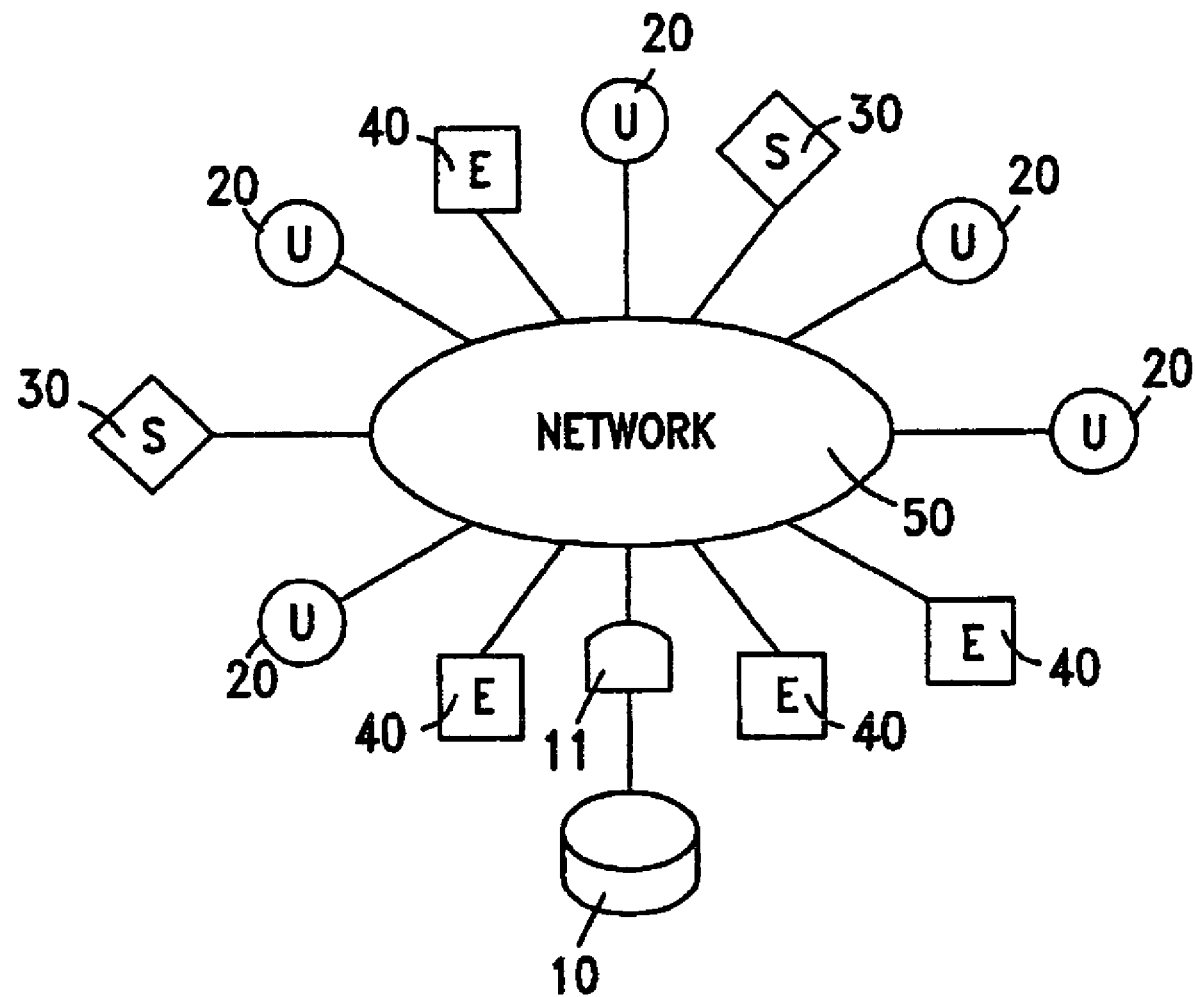
FIG. 2 schematically illustrates a system for sharing knowledge, according to a preferred embodiment of the invention.

FIG. 2 schematically illustrates a system for sharing knowledge, according to a preferred embodiment of the invention. Such a system comprises:

A Knowledge Base System (KBS) 10, which contains information relevant to the maintenance of products or technical issues belonging to the enterprise that owns the KBS;

Us rs 20, the customers of the company;

Service personnel 30, employed by this company, or connected by other agreement with this company;

Experts 40, employed by this company, or connected to the company by another agreement. Said experts may also be employed by another company, self-employed, etc.

A software component 11, for managing the interaction and directing queries and responses between users 20, personnel 30 and experts 40.

According to a preferred embodiment of the invention, the software component (hereinafter briefly called "MEM"—Multi-Engine Manager) is a part of the KBS. According to another embodiment of the invention, the software component is a part of the Web-site mechanism. According to another embodiment of the invention, the software component is a client-software, which resides on the users', the personnel and the experts' computer device. According to another embodiment of the invention, the MEM is a combination of KBS and/or Web-site mechanism and/or client software.

The connection between the users 20, service personnel 30, experts 40 and the KBS 10, is carried out using the network 50, which can be, for instance, the Internet or other WAN. If the use of the system is limited to the company personnel the network can be an Intranet of the company.

The basic need of such systems is to provide advice to the user of such a system (qualified persons, as well as customers) as fast as possible, and sufficiently accurate to allow for timely problem resolution. This calls for an effective combination of all the diagnostic mechanisms described above, along with rapid creation of a quality knowledge base.

The advice to the qualified person will be a combination of the outputs of all the following mechanisms:

From a human expert
From CBR (Case-Base Reasoning)
From MBR (Model-Based Reasoning)
Additional mechanisms (e.g. fault charts)

It is, therefore, usually suggested to utilize all three advice-providers together, using a knowledge base that might have been at least partially created before but is also built on line.

Obviously, the quality of each 'member's' advice will vary based on the status of the knowledge base. If there is no model yet, the chat mechanism will be the only possible venue. The chat mechanism will help to create a case repository, which will be used by the CBR. At the same time, the model will be gradually created. The CBR will probably be the second component to start providing effective advice, while the model-based component will be the third.

Each component not only enhances the knowledge base to be subsequently used by the others—the diagnostic process itself is dynamically influenced. This means that advice provided by a human expert in the chat layer actually adds an element to the current goal set (the list of probable faulty elements or fault causes) to be immediately used by the MBR component for its next step analysis. This same information is also used by the CBR component to refine the retrieval matching cases. Moreover, the advice provided by the CBR layer also adds elements to the goal set that is used by the MBR. Hence, there is cross-pollination between the layers affecting the diagnostics in real time.

All three answers will then be combined into a single set of recommendations to the user, with the weight allocated to each layer's answer reflecting its quality at that point.

Most knowledge bases used for problem resolution are more sophisticated, and designed to carry out a question-and-answer session with the user. In such systems, a case is defined as a collection of reported symptoms, suggested actions (together with their results) and, if available, the actual cause of the fault. A case might be generated as a result of the discussion taking place in the chat room (see above), records stored as part of the business's service database (for example, customer complaints and problem resolutions), or specifically created as input for the CBR mechanism.

When a qualified person reports a problem, the application searches the stored cases repository to find the closest matching case and provides a suggestion accordingly. The search might result in a 'closest matching case', one that yields a probable cause for the fault, thereby concluding the diagnostic process. Or, it finds a similar case from which to retrieve the next test to be suggested to the qualified person. In the latter case, the process continues until a probable fault cause can be suggested. This search is done according to proximity algorithms (such as Nearest Neighbor), which can match cases even when the input to be matched is incomplete.

In model-based systems, the knowledge base consists of an actual representation (topological, functional, etc.) of the system to be diagnosed This presentation or model describes what functional parts the system consists of, which observations can be made, which possible actions taken, how these relate to the functional entities, and so on.

The model is created using a generic terminology and a set of entities that allow modeling of practically any type of system to be determined by the same generic algorithms.

The model allows the computer to 'understand' how the modeled system behaves (or fails) under various conditions. When the qualified person reports an observed symptom, the algorithm can use its 'understanding' of the system to suggest probable causes for the symptom, and the appropriate actions to be taken to better isolate the exact cause. The more complete the model, the better the 'understanding' of the system, which leads to more accurate and efficient diagnostics. Unlike CBR, which matches the input symptom to its stored set of previously encountered cases, the model-based approach can handle faults that have never previously occurred but that can be explained by a good understanding of the system's behavior. Thus, instead of using previous experience (which might not always be available), the diagnostics use actual knowledge of the diagnosed system to tackle ad-hoc occurrences, even extremely rare ones.

The process of the invention operates as follows:

Step 1: A user (customer or a qualified person), encountering a problem the solution of which he does not know, queries the knowledge base to determine whether the problem and its solution are known. Preparing the query is software-assisted by automatically displaying the most relevant terms (such as equipment types, equipment functions and more), known problems, etc., while the user is constructing the query (by picking from lists and/or typing free text).

For example:
Software support:
  How can I print in columns?
  Program X crashes each time I run program Y. What shall I do?
  What add-on products exist for product Z?
Finance:
  Are there any limitations on foreign nationals in investment of type X?
  How long does it take to get a mortgage?
Insurance (including medical):
  What earthquake cover do you offer?
  How do I report a theft?
Telecommunications services:
  What weekend rates do you offer?
  How do I get e-mail on my cell phone?
  How do I make a conference call?
  I cannot hear any ringing when people call my cell phone—what do I do?
Internet service providers:
  How do I get higher-speed connections?
  Why don't I get my e-mail?
Foods:
  How many calories are in product X?
  Please suggest recipes for cooking with Y.
Consumer product:
  Where can I buy X?
  What accessories do you recommend for Y?
  How do I remove food stains" (question to either washing-machine vendor, detergent vendor or fashion vendor)

This list can be extended to just about any type of commercial enterprise manufacturing as well as services—whose activities include answering questions asked by internal staff customers, partners, suppliers, entertainment, travel, etc.

Some of these questions are not specific enough and would require some dialog before giving the requested answer. For example, the question "How long does it take to get a mortgage?" need to ask how much is needed, what securities the asker has.

Step 2: The software component, which manages the interaction, 'queries' the KBS and returns suggestions to the user. This is done in any suitable format that is compatible with the knowledge base and its input.

Step 3: The query prepared in Step 1 is broadcast over the network 50. In the context of the present invention broadcasting can be effected by any suitable means, e.g., through a computer network, a telephone network, e-mail, satellite, cellular, wireless, pager, etc. The query may be broadcast over the network (to secure human advice) if:

(a) MEM finds that the KBS suggestions are below a specified quality (as ranked by the KBS); and/or (b) At least one expert has set a "notification profile" so that it is triggered by the interaction thus far gathered in the case; and/or (c) The user who originated the current issue explicitly requests direct expert advice (other causes may also apply).

The system may broadcast the query solely, or preferentially, to those experts that, according to the knowledge base, are highly experienced in the specific relevant field For instance, if a company services aircrafts and coffee machines, the coffee machines experts will preferentially not receive queries having to do with aircraft engines.

Step 4: The experts who "listen in" the network (as said, by any suitable communication means) may answer the query by filling-in their reply to the query form, and if they desire, also by additional person-to-person communication (e.g., via a voice conversation on Voice-Over-IP, landline phone, or cellular phone). If more than one expert answers the query, the system may decide to take only one of the answers (whether according to seniority of the technician, or on a "first to answer" basis, or on the basis of the technician's expertise and past performance on similar problems, or other management-defined criteria), or to combine some or all answers to the query, ranked according to the aforementioned criteria.

Step 5: The answer to the query (which may be combined from several sources such as the CBR or the MBR component of the KBS and the human expert contributions) is then conveyed (again, via the network) to the qualified person (or user), who tries to fix the problem according to the suggestions received.

Step 6: Once the problem has been solved, or when the suggestions have produced no positive result, the qualified person (or user) reports the outcome to the system, again, in the same way, and this completes the dialogue between the qualified person (or user) and the system. The dialogue, the problem, and information on the suggestion that led to the solution of the problem, are then added to the knowledge base and become part of it, so that the next query on the same problem will automatically produce the suggestions as the first approach to a solution.

Steps 2 to 5 may be iterated any number of times, with the result of qualified person (or user) actions performed in step 5 used as input for the next iteration.

In another embodiment of the invention, the information gathered in the case (e.g., problem, dialogue, and solution, if any) is added to the KBS but flagged as not-yet-approved. Such flagged information goes through a quality control process wherein each such new information is tagged for review by appropriately-authorized experts. These experts are notified of new and as-yet-unreviewed additions to the knowledge base, and are asked to approve, reject, or edit (and then approve) each new addition. This process may use e-mail database management, version control, and/or workflow principles. The system may be set to never retrieve as-yet-unapproved knowledge except when the approved knowledge has no answer.

In another embodiment of the invention, Step 6 is optional: even without it, information from the completed case is added to the KBS. Of course, performing Step 6 makes it possible to contribute more information to the KBS. For this reason, we also have the option of completing the details after the fact, by an expert (who holds the required authorization), and not just by the initiator, regardless of whether this expert participated in the actual interaction.

It should be appreciated that while the actual type of the knowledge base, the queries and input formats, and the processing of the information, are all important parameters in the functioning of the system, the invention is by no means limited to any type of knowledge base, form of query, dialogue or information processing, and any suitable system can be used for these purposes, while retaining all the advantages of the invention.

According to one embodiment of the invention, the system does not broadcast each query to all known experts, but selects which experts should be notified of each query based on the level of match between the query parameters (e.g. problem type, equipment type, urgency, etc.) and the "Notification Profile" listed for each expert. Optionally, if too many experts are matched, the system uses a randomization mechanism to select a smaller number for notification. A notification profile may comprise the following:

Fields of knowledge—described as a combination of types of equipment, types of problems (e.g. operation, installation, etc. with hierarchical structure—e.g. operation can be divided into "washing" and "drying" for a combined washer-drier), subsystems (e.g. in a photocopier electrical, optical, mechanical), and a collection of relevant keywords;

Geographical region;

Profile of client (e.g. residential, business, terms of Service Level Agreement);

Duration of time since first reported (e.g. a senior engineer might set his notification profile to "every problem reported more than 4 hours ago and not yet solved");

Expert's reliability and expertise ranking in the specific problem context (as defined by management and/or as updated by reviewing performance of that expert in earlier similar contexts).

From this it is clear that the profile for one expert can include any number of records. For each such record, the engineer can specify how to notify him, notification methods including at least business phone, cell phone, home phone, fax, e-mail, pager, and instant-messaging (as in ICQ—if he is online, he will see a pop-up message). Obviously, the profile should include relevant information (e.g. phone numbers, ICQ user-id, e-mail). For example, a profile might include the following entries:

"Notify me of any photocopier problem if I'm on-line";

"Notify me by pager and by message to my home fax if there's a page-stuck problem on a model X76 copier"; and "Notify me by cell phone of any problem reported by users whose service-level-agreement specifies all problems solved within 4 hours or less".

Notification-Profiles may be set by the expert and/or by the expert's manager. Additionally, the MEM may track the expert's performance and periodically compare it to stated fields of knowledge defined for that expert. This comparison may discover the need to add, delete or modify these definitions. These changes may be configured to be automatically performed, or forwarded to the expert (or his manager) for approval.

EXAMPLE

A scenario regarding the implementation of the invention over the Internet, according to a preferred embodiment of the invention, may look as follows:

A technician repairing VCR (video cassette recorder) at laboratory. Could not solve problem.

In the following discussion, the software implementing the invention will be designated as ClickFix or CF for short.

1. Technician—Joe Brown—opens CF (ClickFix) page on his browser.

2. Technician clicks "New problem".

3. Technician identifies brand and model of video—by typing it in or by selecting from list boxes or tree.

4. CF asks technician to describe the problem. At this point the screen looks conceptually as shown in FIG. 7.

As shown in the figure, CF displays lists (optionally hierarchical) of known symptoms. Each of these symptoms may have documentation (text, video, audio—e.g. what kind of noise is heard while rewinding) associated with it, which can be accessed by clicking on a "doe available" icon next to the symptom name.

5. Technician starts typing and has reached "cannot load cassette". While he's typing, CF automatically retrieves and displays best matches, as shown in FIG. 8.

6. Technician may submit typed symptom or click on any named symptom. In this case, technician clicks on "VCR rejects cassette".

7. CF accesses its knowledge base and retrieves several possible actions that may be relevant. It creates a display for the technician, as shown in FIG. 9.

The suggestions all came from CFs knowledge base and are ranked by likelihood and by time it takes to perform the action (marked with "!") or answer the question (marked with "?").

Again, each such item (including possible answers—it will be shown later that some questions are more complex than simple Yes/No answers) may be linked to documentation, and Joe can access any such information by clicking on the appropriate icon (not shown) next to the item.

8. Joe answers all the questions, as shown in FIG. 10.

9. CF changes the display, as shown in FIG. 11.

Of course Joe is not forced to perform each action and answer each question. He has the option (not shown) to mark questions and actions as "Skip", thereby telling CF he rejects these suggestions.

10. CF examines its list of expert profiles and finds that Mary White, Dave Black and Alice Green are currently on-line and are experts on this brand of VCR. Both receive high-priority notifications on their screen that a new problem requires their attention. Both may be handling several calls at the same time. Mary reacts first by clicking on the notification. This causes CF to lower the priority of the notification displayed on Alice's and Dave's screen. They may still access the problem and participate in the resolution process, but this won't be shown in this scenario.

11. At this point, Mary's screen may look as in FIG. 12:

As in can be seen, Mary is handling two problems: Joe's problem from this scenario and another one—Karen's DVD problem. She is now viewing details of Joe's problem. She has already made some suggestions to Karen. CF will notify Mary when Karen acts on Mary's suggestions and reports some results. In the mean time, Mary is free to work on the VCR problem.

We can also see Mary's queue, with a couple of other problems that CF has determined she might be able to help with. The priority assigned by CF depends on many parameters, including relevance of problem to Mary's expertise; time that the asker is already waiting; number of other experts who have relevant knowledge (if Mary is the only one, the priority will be higher than if there are dozens); importance of customer who brought in the VCR (e.g. existence and terms of service agreement); and more.

12. Mary composes one or more additional suggestions by using an interface that in this example, is as shown in FIG. 13.

If Mary wants to suggest a question, she will need to specify whether it's a Yes/No question or a question with several different possible answers—single-choice such as "What is the voltage at TP5—less than 1V or 1-5V or over 5V?" or multiple-choice such as "Does examining wheel W56 show abrasion and/or off-center movement and/or lack of oil?".

As in step 5, if Mary types text, CF will keep updating the list of matches that best fit the text typed so far. In this case, CF will also display the list of possible answers defined for each retrieved question.

Mary may browse through available on-line documentation to find appropriate web pages (or video, audio etc.) explaining her suggestions (e.g. instructions on how to perform the suggested action), and link such pages to her suggestions. Joe will see an "have doc" icon next to such items and will be able to access the documentation marked by Mary. Mary and Joe can also start a collaborative Web session, possibly involving shared browsing, shared applications, shared whiteboard, and Voice-Over-IP or "traditional" conversations.

Mary may indicate what resources are required for performing her suggestions (e.g. voltmeter or the actual spare part for replacement action).

13. As Mary contributes her suggestions, they appear one-by-one on Joe's screen. At this point, Joe and Mary (and any other expert—or maybe technician—who has also accessed this problem) are actually collaborating on the same view of the problem.

The suggestions are ranked by CF according to data supplied by Mary as well as by data already stored in the knowledge base (e.g. time required for each suggestion may already be known, as well as cost for wheel W56).

If Mary has contributed three suggestions. Joe's screen now looks as shown in FIG. 14.

If a specific resource (e.g. Wheel W56) is required, Joe will see a "resource icon" (not shown here) next to the suggestion requiring this resource. Joe can click on that icon and either (a) state that he has it; (b) state that he does not have it and does not expect to have it (in which case CF will remove the suggestion, and others requiring the same resource, to the list of skipped suggestions mentioned earlier, which may or may not be displayed according to user preferences); or (c) request data on how to obtain it (which may lead Joe to company-internal inventory management screens or to e-commerce sites outside his company).

15. At this point, Mary's screen shows the suggestions she has made, and shows the status of Joe's problem as "awaiting answer". She is now free to work on another problem in her active-list or from her queue.

16. Once Joe performs one or more of the suggestions, this will be indicated to Mary (and the status will change to "awaiting expert"), who will return to the screen displaying details of Joe's problem and examine the new "evidence".

17. CF's knowledge-base software continues monitoring the interaction, and can add its own suggestions triggered by Mary's questions and Joe's answers—it is quite possible that after a few more facts are known, CF will find relevant knowledge in its knowledge base.

18. The process continues until Joe performs some action that solves the problem. CF may be configured to ask Joe to verify the solution (guiding him through final testing before notifying the customer that the VCR has been fixed) and verify which action or actions were relevant to the solution. Once this is finished, CF removes the problem from everybody's screens.

19. CF will "remember" the interaction and will reuse it or parts of it for other probl ms, if they bear some similarities to this problem.

In some scenarios, each user may simultaneously play both roles, that of the party seeking to solve some problems, and the role of expert on other problems. For such cases, the invention would be embodied in a user interface that combines elements of both types of user interfaces shown in FIG. 7 to FIG. 14.

This example has of course been provided for the purpose of illustration and is, therefore, simplified in nature.

In order to encourage usage of the knowledge base, a remuneration policy can be implemented. Moreover, a rating policy can be used as well, so that the experts will be motivated to do their best not only for financial gain, but to improve their position within the organization. Implementation of such a policy may comprise the following:

Rating the experts according to the users' recommendations;
Rating the experts according to the number of problems solved by them;
Publishing the index of ratings, together with their names, in the experts list;
Publishing the number of questions together with their names in the experts list;
Financial bonus for every question they answer;
Financial compensation for the time spent chatting with users.

It should be noted that incentive need not necessarily be represented by a financial bonus. It might also be comprised of "points" to be used for many different purposes, and the financial aspect is one of them. The incentive may be also a factor in evaluating periodic employee ratings, the gaining of frequent-flier miles, "virtual dollars" to spend on entertainment and services, etc.

The incentive may also depend on:
How much of the knowledge currently stored in the KBS was contributed ("knowledge equity");
How many of the cases in the past period (e.g. month, quarter) were resolved directly by the expert, or indirectly by the KBS, using knowledge contributed by the expert.

The firm may also charge the users for use of the knowledge base, for answers to their questions, etc. Thus, for instance, an independent service person may gain access to the knowledge base of a large service company, and benefit from the knowledge contained therein and by the contact with problem-solving experts, in return for a payment on a usage (e.g., time or number of queries) basis or on a periodic basis.

An independent service person may be asked by a large service company to monitor reported problems which were not resolved quickly enough by the company's personnel (such a person's notification profile will only notify him regarding, or let him access, such cases). This person will be paid by the service company for any case he resolves. This opens up business-model possibilities in the "knowledge economy".

The knowledge base and the other services the Web site provides may be used not only by the customers, but by the personnel of the company, as well. However, since such information may be confidential, a suitable system may enable different levels of access, each level with its own attributes.

Reusing Captured Knowledge

All the interactions, as described in the above example, are stored in the KB as cases. When new problems are reported, ClickFix will use CBR methods to retrieve these cases and suggest new solutions, so that—for example—the suggestion composed by Mary in step 12 will be automatically used by ClickFix, with no need for human-expert involvement, in handling future cases.

Additionally, ClickFix's MBR component will use the cases generated through such interactions in creating and/or refining its Model-Base. The MBR uses different learning and inference algorithms, and its cooperation with CBR raises the quality of suggestions generated by ClickFix.

Other Means of Building the Knowledge Base

The description above showed how the KB is generated as a result of recording and reusing human-to-human interactions. Our invention supports additional means of building and maintaining the KB:

A. The expert may create CBR and MBR content directly through software knowledge authoring models;

B. The expert may import data (cases, lists of symptoms, lists of replaceable parts, lists of applicable observations and measurements, lists of possible repair actions, engineering data such as block diagrams, simulation data and reliability estimates etc.) into the KB;

C. After one or more cases have been handled, the expert may engage in a dialog with the expert system concerning these cases. The expert may highlight a suggestion made by the expert system and ask the software why this suggestion was made, and if necessary supply specific knowledge that will prevent this suggestion from being made again for the same context. Similarly, the software may highlight a suggestion made by the expert that contradicts the software's knowledge, and the expert may then supply knowledge to support that suggestion and contribute to the software's "understanding" of when it is applicable.

Additional features can be added to a system operating according to the invention. For illustrative and non-limitative purposes, FIG. 3 schematically shows a Web site, according to a preferred embodiment of the invention A Web site may be a particularly suitable implementation of the present invention, since the Web has become a common communication channel.

Figure 3:
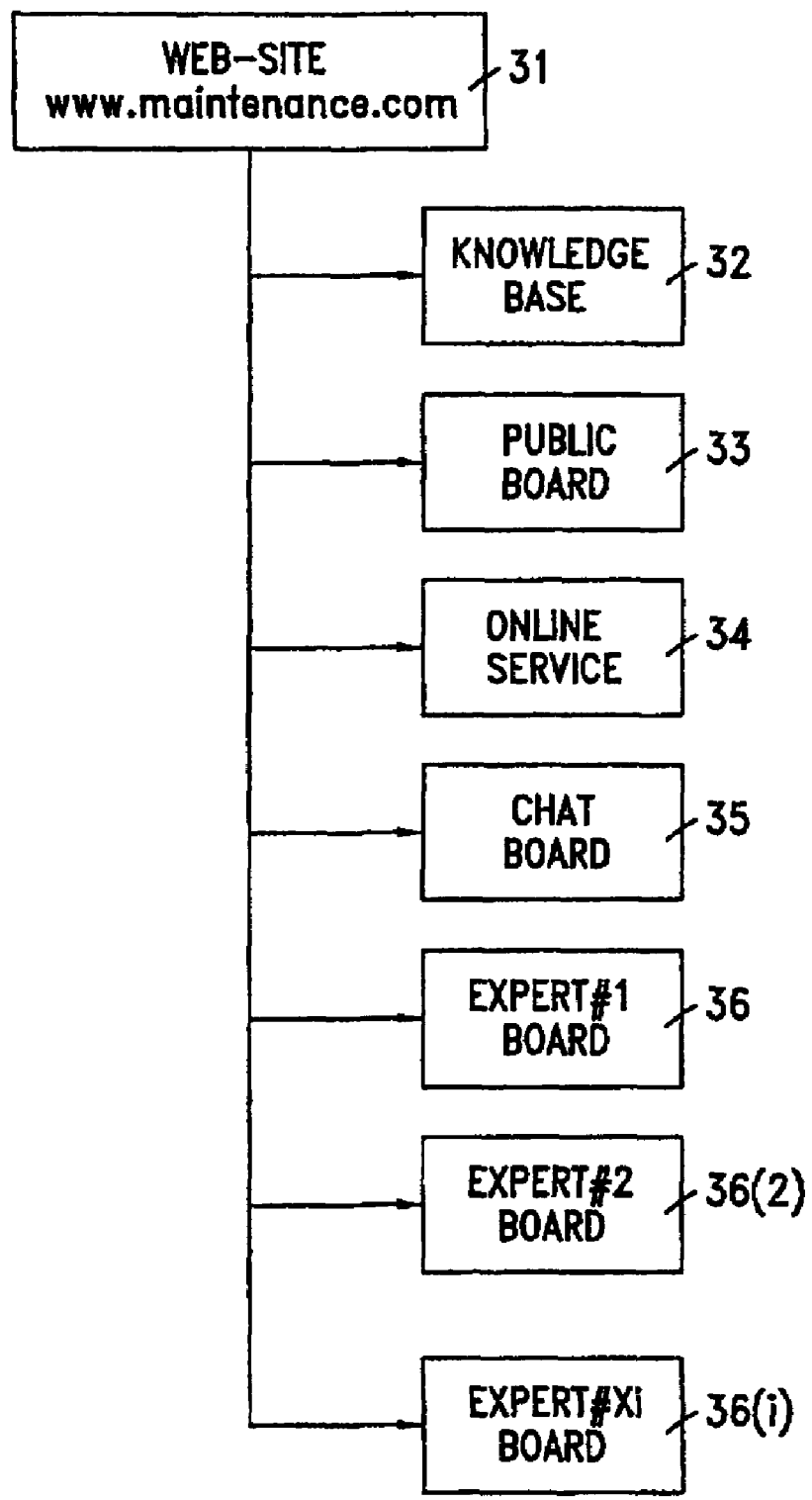
FIG. 3 schematically illustrates a Web site, according to a preferred embodiment of the invention.

In FIG. 3, the Web site 31 comprises:
a knowledge base 82, that operates according to the system described above with reference to FIG. 2, and in addition:
a public board 33;
an online service 34;
a chat board 35; and
expert boards 36-36$_{(i)}$.

The public board 33 may be implemented in the fashion of the News service of the Internet. The users may leave their questions, remarks, etc. on the board, and other users or qualified persons may respond to the questions. They may leave the answers on the board, or directly respond to the user by e-mail.

The online service 34 is a private chat room, wherein a user may carry on a conversation (in the chat fashion) with a qualified person.

In the chat board 35, the users may carry out a group chat session In such a chat, the experts may participate, as well as the users, and therefore, each participant may contribute his experience to the chat.

The expert boards 36 contain questions directed to individual experts, and the answers provided by the experts. The users may prefer one expert or the other according to the subjects he deals with, his experience and expertise, etc.

Figure 4:
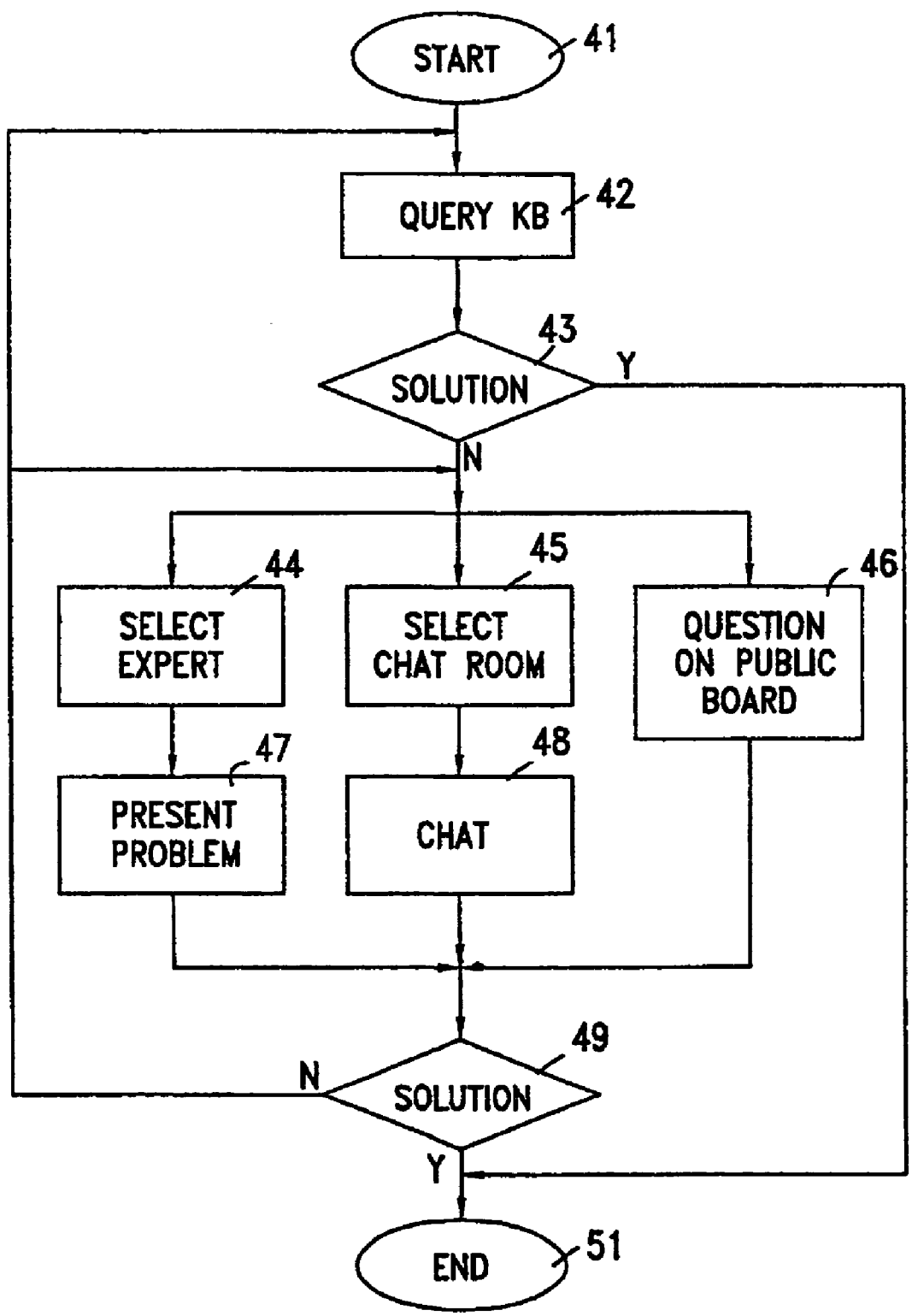
FIG. 4 schematically illustrates the activities of a user on a Web site tat comprises a knowledge base, according to a preferred embodiment of the invention.
Figure 5:
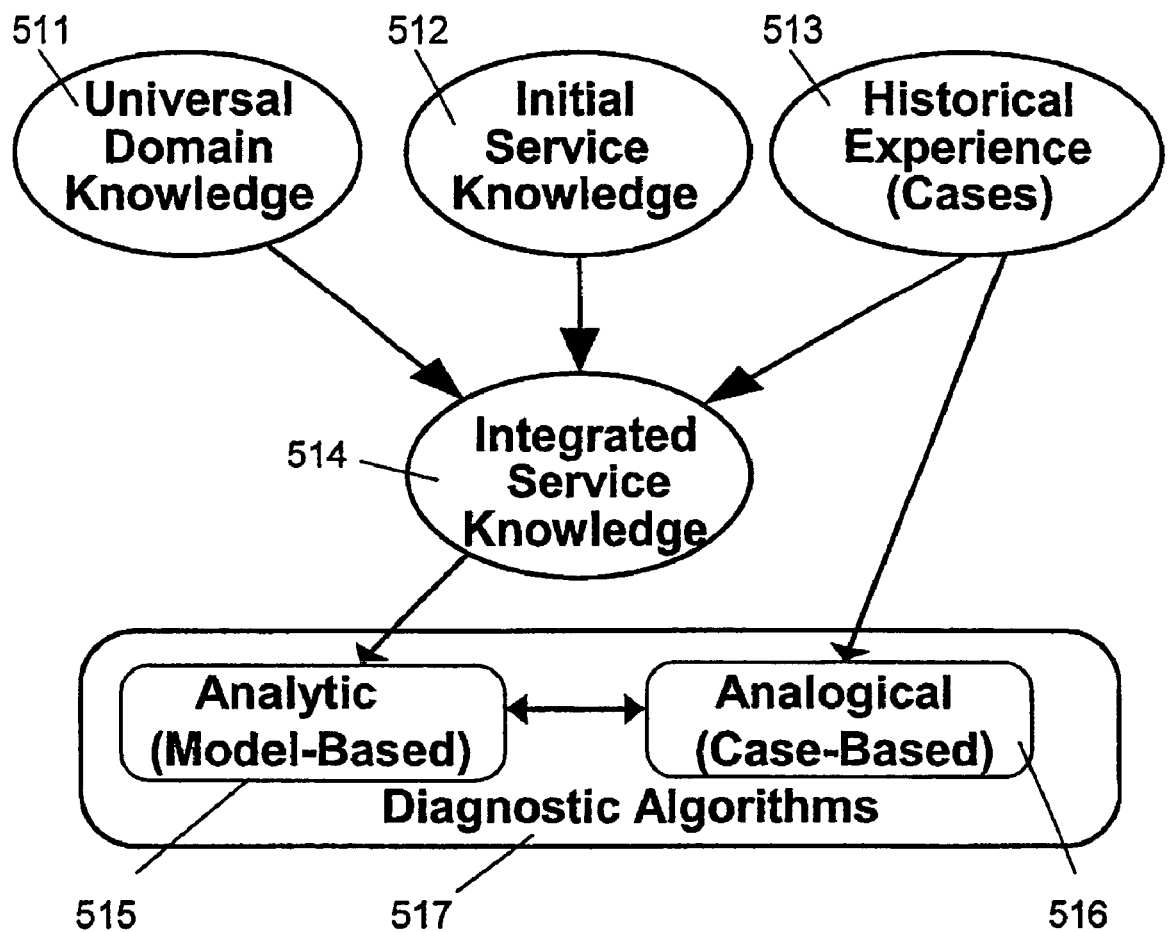
FIG. 5 schematically illustrates the overall approach, according to the prior art.
Figure 6:
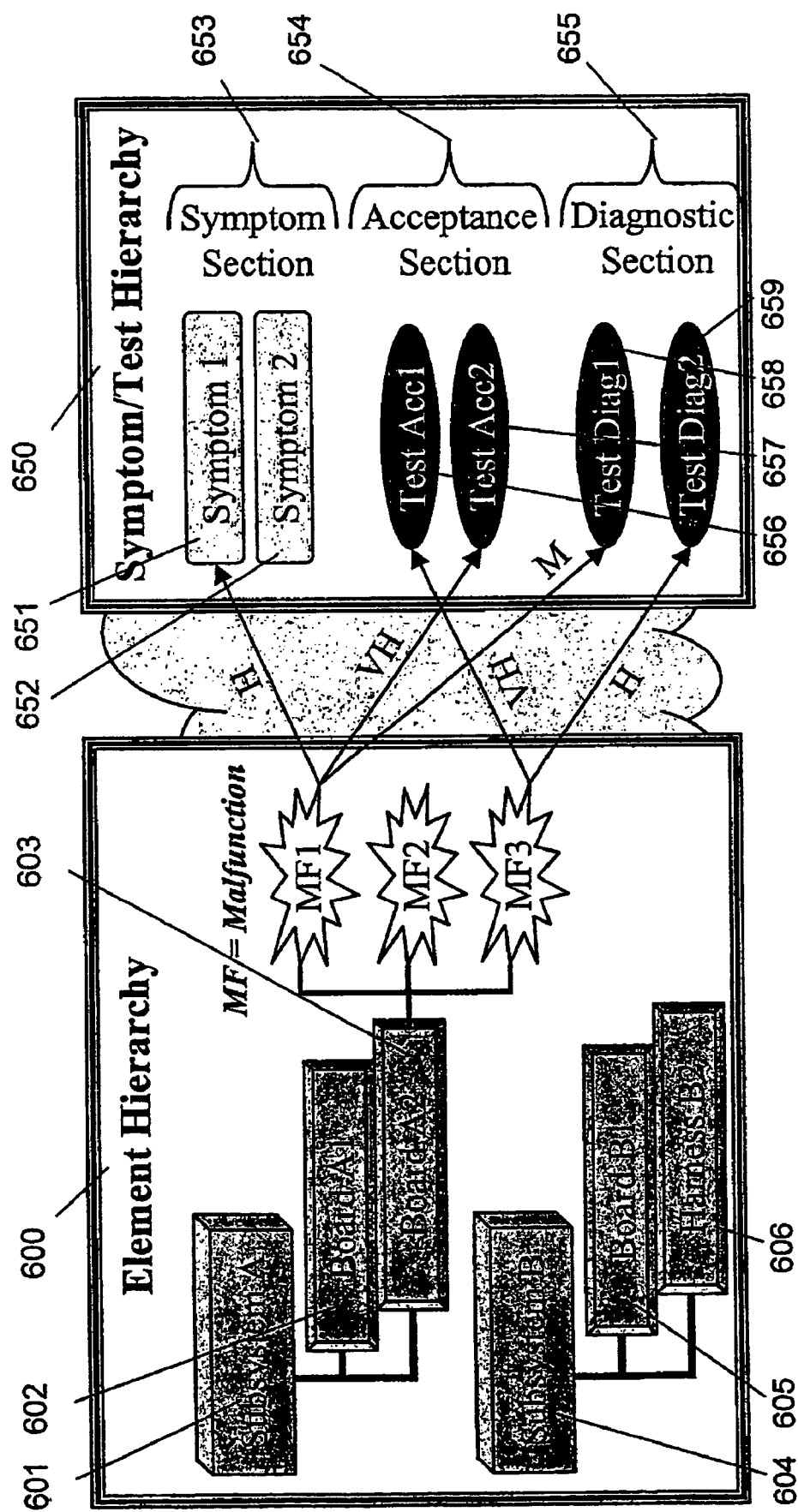
FIG. 6 schematically illustrates a possible method of defining the different parts of the problem resolution model and their interaction, according to the prior art.

FIG. 4 schematically illustrates the activities of a user on a Web site that comprises a knowledge base, according to a preferred embodiment of the invention, and which comprises additional options as detailed with reference to FIG. 3.

In Step 41, the process starts, i.e., with the display of the Web site home-page;

In Step 42, the user poses a query to the knowledge base. Such a query comprises a list of keywords and the logical relation between them. For instance: (Keyword1 OR Keyword2) AND Keyword3. A more sophisticated system may contain the ability to analyze free-text queries, such as "My washing machine leaks".

In Step 43, the user assesses the result of the query. If the answer is satisfactory, then the process ends at step 51, otherwise, the user selects one of the following paths:

proceed to Step 44, directing the question to an individual expert;

proceed to Step 45, attempting to get an answer from other users engaged in a chat (who can be other qualified persons, when the "user" is a qualified person and the network is an Intranet or other private or semi-private WAN);

proceed to Step 46, placing the question on the public board.

In Step 44, the user selects an expert from a list. The particular expert is selected by the user according to the subjects he deals with, his expertise, his popularity, etc.;

In Step 47, the user directs a question to the expert. The question may be sent to the expert by e-mail, or by a public board which is edited by the expert, etc.;

In Step 45, the user selects a chat room. Usually a chat room is directed to a subject or to an expert;

In the next Step 48, the user carries out a chat with other users. In the chat session, the user may ask for assistance;

In Step 46, the user places a question on the public board. The public boards have a general nature, i.e., are not dedicated to a specific subject. In this way, the user may receive an answer to his question from both experts and other users.

In Step 49, the user assesses the answers he has received. Should the answers prove unsatisfactory, the user may try again, by proceeding to Step 42 or to Step 44, 45 or 46. He may refine his query by selecting other keywords, by redefinition of the logical relations between the keywords, etc. If the answer he received was satisfactory, he may quit (Step 51).

The above options may be provided to users who are customers, or to novice technicians, as "light options", i.e., to solve simple questions and problems that do not require the intervention of experts as described with reference to FIG. 2. Such options may prevent unnecessary demand on the resources of the experts and the knowledge base, but they are of course optional, and by no means form a necessary part of the invention. A knowledge base that is properly managed contains pointers to the questions and answers dealt with.

If the above-mentioned "light options" have not provided a proper answer to his question, the user may call the maintenance service or the help desk personnel of the company, or, if his system allows it, even try to operate the query system as described with reference to FIG. 2.

The above examples and description have of course been provided only for the purpose of illustration, and are not intended to limit the invention in any way. As will be appreciated by the skilled person, the invention can be carried out in a great variety of ways and for a great variety of knowledge domains such as commerce, entertainment, travel, telecommunication services, insurance and financial services, employing more than one technique from those described above, all without exceeding the scope of the invention.

The invention claimed is:

1. A computer implemented method for providing a combination of human expert type and database type technical support to users via a network, which comprises the steps of:
   a. providing a database which contains searchable technical support information, said technical support information being remotely accessible to the users, being divided into a plurality of textual support sessions, each support session being formatted as a serial dialogue of:
      a.1. one or more textual questions to the user for receiving failure symptoms from the user; and
      a.2. textual guidance for performing operations by the user in order to solve the failure, based on the failure symptoms received from the user, and report by the user stating the corresponding results of said operations;
   b. providing within said network at least one on-line expert terminal;
   c. providing to the users a remote access to said database;
   d. when a user who needs a technical support accesses said database in order to find a solution to a failure the user faces, performing an electronic serial dialogue between the database and the user which includes said introduction of questions and providing of guidance as in steps a.1 and a.2;
   e. if in response to said serial dialogue a solution to the failure is obtained, terminating by the user the dialogue;
   f. if, however, no solution to the failure is obtained at the end of said serial dialogue between the user and the database, immediately transferring a display of the dialogue as so far conducted to selected one or more of said on-line expert terminals;
   g. continuing by the one or more experts by means of said terminals said serial supporting dialogue with the user, while using a same textual format as in steps a.1 and a.2; and
   h. when a solution to the failure is obtained based on the textual dialogue between the one or more experts and the user, adding said formatted textual dialogue between the expert and the user to the database, thereby expanding the scope of support of the database.

2. The computer implemented method according to claim 1, wherein in step (g) more than one expert attend the same session with the user, thereby all attending experts contributing to the failure solution.

3. The computer implemented method according to claim 1, further comprising forwarding via a network the display of the dialogue from a first expert to a second expert for providing further textual support, in case said first expert failed to find a solution to the failure.

4. The computer implemented method according to claim 3, wherein the transfer to the second expert is based on seniority criterion.

5. The computer implemented method according to claim 1, wherein the transfer to the one or more selected experts is based on "first to answer" criterion.

6. The computer implemented method according to claim 1, further comprising within each supporting session an indication of one or more possible experts to which the session will be forwarded in case of no solution to the user failure.

7. The computer implemented method according to claim 1, wherein the experts being divided into groups, according to the type of equipment or according to the type of failure.

8. The computer implemented method according to claim 1, further comprising within each supporting session an indication of priority, according to the failure severity.

9. The computer implemented method according to claim 1, wherein said addition of the formatted textual dialogue to the database goes through a quality control process.

10. The computer implemented method according to claim 1, wherein the on-line expert terminals are mobile, wireless terminals.

* * * * *